(12) United States Patent
Xie et al.

(10) Patent No.: US 11,543,307 B1
(45) Date of Patent: Jan. 3, 2023

(54) SENSOR WITH CONTROLLABLE ADHESION AND PREPARATION METHOD THEREOF

(71) Applicant: Zhejiang University, Hangzhou (CN)

(72) Inventors: Yu Xie, Hangzhou (CN); Liqian Wang, Hangzhou (CN); Jin Qian, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/943,590

(22) Filed: Sep. 13, 2022

(30) Foreign Application Priority Data

Dec. 10, 2021 (CN) .......................... 202111505047.X

(51) Int. Cl.
| | | |
|---|---|---|
| *G01L 1/00* | (2006.01) | |
| *G01L 1/22* | (2006.01) | |
| *G01K 7/16* | (2006.01) | |
| *G01H 11/06* | (2006.01) | |

(52) U.S. Cl.
CPC ............... *G01L 1/22* (2013.01); *G01H 11/06* (2013.01); *G01K 7/16* (2013.01)

(58) Field of Classification Search
CPC ............. G01L 1/22; G01H 11/06; G01K 7/16
See application file for complete search history.

(56) References Cited

U.S. PATENT DOCUMENTS

| 10,441,185 B2* | 10/2019 | Rogers | ................. A61B 5/4875 |
| 2019/0231267 A1* | 8/2019 | Oren | ....................... B32B 37/12 |
| 2020/0413533 A1* | 12/2020 | Majidi | .................. G06F 1/1658 |

(Continued)

FOREIGN PATENT DOCUMENTS

| CN | 107884101 A | 4/2018 |
| CN | 110767349 A | 2/2020 |

(Continued)

OTHER PUBLICATIONS

CNIPA, Notification of a First Office Action for CN202111505047.X, dated Jan. 20, 2022.

(Continued)

*Primary Examiner* — Max H Noori
(74) *Attorney, Agent, or Firm* — Hemisphere Law, PLLC; Zhigang Ma

(57) ABSTRACT

A sensor and a preparation method thereof are provided, the sensor includes a sensor substrate, functional cuts, crack-arrest holes, a patterned electrode, wires, an adhesive layer, and release paper. The preparation method includes following steps, preparing the sensor substrate and sticking the adhesive layer on the sensor substrate; then sticking the release paper on the adhesive layer; obtaining the functional cuts by laser cutting or blanking process; pasting a metal mask on a surface of the sensor substrate; depositing a material of the patterned electrode into a gap of the metal mask; removing the metal mask after a solvent of the liquid is volatilized; leading out the wires from patterned electrode pins; obtaining the sensor eventually. The sensor has advantages such as controllable adhesion, small size, light weight, sensitive sensing and simple manufacturing. The sensors are arrayable and suitable for sticking and sensing of large deformation and complex surfaces.

6 Claims, 10 Drawing Sheets

(56) References Cited

U.S. PATENT DOCUMENTS

2021/0053329 A1*  2/2021  Sun ..................... B32B 25/20
2022/0076091 A1*  3/2022  Volkerink .......... G06K 19/0717

FOREIGN PATENT DOCUMENTS

| CN | 111684098 A | * | 9/2020 | ......... A61B 5/14532 |
| JP | 6907806 B2 | * | 7/2021 | |
| WO | 2020195845 A1 | | 10/2020 | |

OTHER PUBLICATIONS

Zhejiang University (Applicant), Reply to Notification of a First Office Action for CN202111505047.X, w/ replacement claims, dated Jan. 27, 2022.

Zhejiang University (Applicant), Supplemental Reply to Notification of a First Office Action for CN202111505047.X, w/ (allowed) replacement claims, dated Feb. 11, 2022.

CNIPA, Notification to grant patent right for invention in CN202111505047.X, dated Feb. 25, 2022.

* cited by examiner

SENSOR WITH CONTROLLABLE ADHESION AND PREPARATION METHOD THEREOF

TECHNICAL FIELD

The disclosure relates to a technical field of flexible sensor, in particular to a sensor and a preparation method thereof.

BACKGROUND

Controllable adhesion is very important for flexible electronic devices, biopharmaceutics and other fields. It is not only an important condition to ensure the functionality of devices, but also closely related to the precise positioning, adsorption, separation and transfer of materials or devices. Adhesion of traditional sensors is generally realized by pressure. The traditional sensors have sensitive response and strong performance, but the adhesion of the traditional sensors is uncontrollable. Either the adhesion is firm and difficult to tear off, or the adhesion is weak and difficult to adhere. It is particularly difficult to achieve controllable adhesion and separation, and once the traditional sensors are separated from the surface, they are difficult to be used again, and the reuse rate of them is very low. In addition, in order to obtain strong adhesion, some sensors usually use adhesive agents with high viscosity, resulting in separating the sensors from devices are difficult and leaving the adhesive agents on surfaces of the devices, therefore removing the adhesive agents are difficult and affecting the use of the devices. It can be seen that it is difficult to control adhesion and separation. If good adhesion and easy separation can be achieved at the same time, it has a great significance to improve production efficiency.

People have explored ways of achieving the controllable adhesion by designing different microstructures. Such as bionic mechanical claws inspired by geckos, and fiber arrays; but cost of them are high due to their precise sizes, complex structures and vulnerabilities. Therefore, a design of patterning adhesive interfaces has been paid more and more attention. The design generally controls adhesion by changing material properties or interface properties in specific areas.

The design is often applied to sensors or materials with thin thickness, such as manufacturing and transportation of wafers and printed circuit boards. However, the existing patterning technology is difficult to have strong adhesion and easy separation.

SUMMARY

In order to overcome shortcomings of the prior art, the disclosure provides a sensor and a preparation method thereof.

To achieve the above purpose, the disclosure adopts following technical schemes.

A sensor, including a sensor substrate, an adhesive layer, and a release paper sequentially connected in that order; a surface of the sensor substrate is provided with functional cuts; one of the functional cuts is a cutting line disposed axisymmetrically along a peeling direction and penetrates the sensor substrate; ends of the functional cuts each are provided with crack-arrest holes; a patterned electrode is surrounded by the functional cuts, the patterned electrode is adhered on the surface of the sensor substrate, and pins of the patterned electrode are connected to wires respectively.

Preferably, a pattern formed by the functional cuts is one of a hollow type pattern, a dashed line type pattern, and an asymmetric dashed lined type pattern.

In an embodiment, the sensor substrate is a flexible film made of one of polyisocyanate (PIC) hydrogel, polyethylene terephthalate (PET), and polydimethylsiloxane (PDMS).

In an embodiment, a material of the patterned electrode is one of a group consisting of silver nanowire, gold, copper, tin-doped indium oxide (ITO), and poly(3,4-ethylenedioxythiophene):poly(styrene sulfonate) (PEDOT:PSS).

In an embodiment, the adhesive layer is an acrylic adhesive layer.

In an embodiment, a thickness of the sensor substrate is 0.1~0.5 mm; a total thickness of the sensor is less than 3 mm; a gap width of each of the functional cuts is less than 0.2 mm; a diameter of each of the crack-arrest holes are 0.5~3 mm; a ratio of a width of the functional cuts to a width of the sensor substrate is more than 1:4; a thickness of the patterned electrode is more than 0.1 mm, and a line width of the patterned electrode is less than 0.3 mm.

The disclosure provides a preparation method of the sensor, including following steps:

step (1): using the flexible film to prepare the sensor substrate, sticking the adhesive layer on a bottom of the flexible film, and sticking the release paper on a bottom of the adhesive layer as a protective layer;

step (2): obtaining the functional cuts for controllable adhesion by one of laser cutting and blanking process, using industrial alcohol to clean a surface of the sensor substrate, and treating the sensor substrate by plasmas with 40~100 watt (W) power for 2~5 minutes to improve surface activity of PIC hydrogel;

step (3): sticking a metal mask having a pattern of the patterned electrode on the surface of the sensor substrate prepared in the step (1);

step (4): depositing a material of the patterned electrode into a pattern gap of the metal mask by one of spin coating, etching, vapor deposition, and magnetron sputtering; then removing the metal mask after a solvent being volatilized, and sticking copper foils at the patterned electrode pins to lead out the wires, therefore obtaining the sensor.

Beneficial effects of the disclosure are described below.

(1) The sensor disclosed by the disclosure has strong adhesion and easy peelability. There is a significant difference in adhesion when the sensor is peeled along the opposite directions. Directly changing width of the cuts can effectively adjust the adhesion of the sensor, therefore the adhesion force is controllable. The disclosure also provides some embodiments to meet different requirements and improve the designability of the sensor. The disclosure can meet different adhesion requirements by adjusting the widths and other dimensions of the cuts and pore structures, and there is a significant difference in the adhesion between a forward direction and a backward direction, therefore, the sensor realizes strong adhesion and easy peelability.

(2) The sensor disclosed by the disclosure is a resistive sensor for stimulus response. The sensor has an excellent sensing effect and can integrate multiple functions such as object deformability, physical property change, and surface recognition. The sensor also has a wide strain sensing range and an obvious mapping relationship, and can meet the needs of adhesion on surfaces with large deformation at the same time. The disclosure combines the excellent mechanical and electrical properties of the silver nanowires and the PIC hydrogel, therefore the disclosure can make a sensitive response to stimuli such as tension, gravity, vibration, and temperature; the disclosure can also generate stable resistance changes based on multi-mode stimuli such as force and heat, and has a good mapping relationship.

(3) A structure of the sensor disclosed by the disclosure is simple. The sensor has a simple processing method and large manufacturing freedom and low manufacturing threshold, and can be applied to existing production equipment to effectively reduce the manufacturing cost.

(4) The disclosure has a wide range of application. The sensor substrate will not be limited by designing the cut patterns of the sensor, it can ensure that the sensor can be widely applied to surfaces of skin, metal, plastic, glass, and other materials, and can adapt to the topography and large deformation of adhered surfaces.

(5) The sensor disclosed by the disclosure can realize close adhesion on complex surfaces, and the cuts are conducive to deformability and reducing damages to the sensors. Therefore, improving the service life and reusability of the sensor.

(6) When a material of the sensor is a deformable material such as elastic cloth. By the design of the cut patterns, it is helpful to realize the close adhesion of the sensor on the highly deformed surfaces, at the same time, it can ensure the directionality of peeling the sensor and adapt to the surface adhesion of the highly deformed and complex curved surfaces. The design is helpful for ventilation and can reduce damages to the adhered surfaces. The design also reduces damages to the sensor substrate caused by peeling off the sensor, and can improve the adhesive effect of medical patches such as sensors, adhesive tapes and plasters on soft adhered surfaces.

BRIEF DESCRIPTION OF DRAWINGS

FIG. 2 (b) is a comparison diagram of the sensor with the square adhesion functional area peeled along forward and backward directions individually.

FIG. 3 (b) is a schematic diagram of a sensor with asymmetric dashed line type cuts attached to the human joint.

FIG. 4 (b) is the relationship curves of peak peeling force versus different widths of the functional areas under opposite peeling directions.

FIG. 5 (b) is a schematic diagram of a sensor cut pattern formed by a dashed line type cuts.

FIG. 5 (c) is a schematic diagram of a sensor cut pattern formed by dashed line type cuts and an asymmetric adhesion type cut.

FIG. 6 (b) is a schematic diagram of resistance change curves of a sensor with or without a square cut under repeating sticking.

FIG. 7 (b) is a schematic diagram of a resistance change curve of a sensor with asymmetric dashed line type cuts based on paper cutting.

FIG. 8 (b) is a schematic diagram of a weight-resistance induction curve of the sensor.

FIG. 9 (b) is a schematic diagram of a weight-resistance induction curve of the array of sensors when the "X" shaped object is placed.

FIG. 9 (c) is a schematic diagram of the array of sensors placing a "Y" shaped object.

FIG. 9 (d) is a schematic diagram of a weight-resistance induction curve of the array of sensors when the "Y" shaped object is placed.

FIG. 10 (b) is a schematic diagram of a resistance change curve of a sensor based on temperature sensing.

DESCRIPTION OF REFERENCE NUMERALS

1—sensor substrate; 2—functional cut; 3—crack-arrest hole; 4—patterned electrode; 5—wire; 6—adhesive layer; 7—release paper; 21—hollow type cut; 22—dashed line type cut; 23—asymmetric dashed line type cut; 41—serpentine electrode.

DETAILED DESCRIPTION OF EMBODIMENTS

Figure 1:
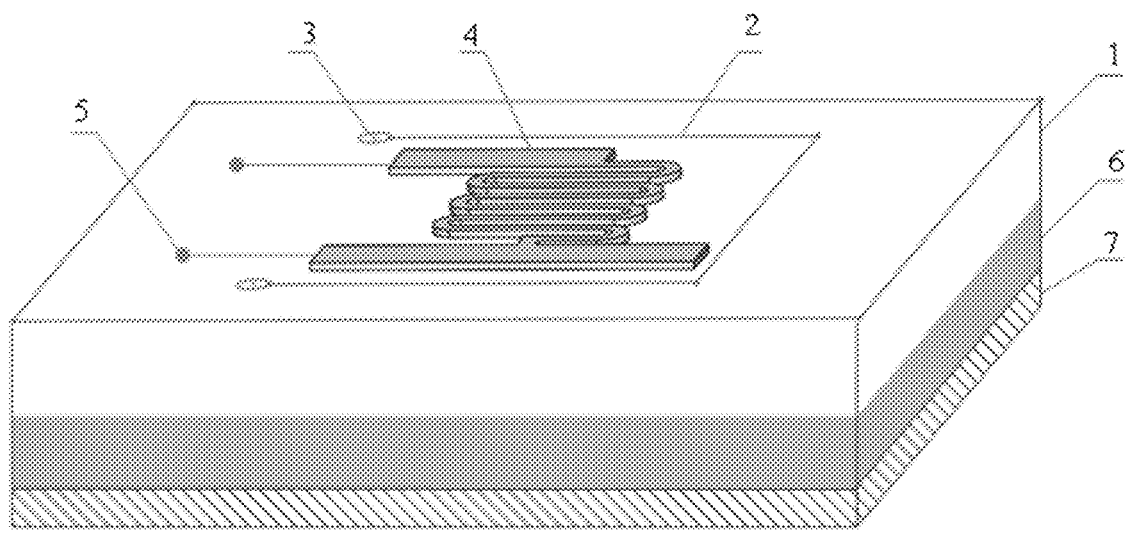
FIG. 1 is a schematic structural diagram of a sensor of the disclosure.

The disclosure provides a sensor, a structural diagram of the sensor is shown in FIG. 1, the sensor includes a sensor substrate 1, functional cuts 2, crack-arrest holes 3, a patterned electrode 4, wires 5, an adhesive layer 6, and a release paper 7. A bottom of the sensor substrate 1 is coated with the adhesive layer 6; a bottom of the adhesive layer 6 is covered with the release paper 7 for protecting the adhesive layer; a surface of the sensor substrate 1 is provided with functional cuts 2; one of the functional cuts 2 is a cutting line disposed axisymmetrically along a peeling direction and penetrates the sensor substrate 1. Preferably, a pattern of the functional cuts is one of an unclosed type pattern, a dashed line type pattern, and an asymmetric dashed lined type pattern. Each end of each of the functional cuts 2 is provided with a crack-arrest hole 3, the crack-arrest hole 3 can prevent cracks from spreading due to stresses concentrating inside the sensor substrate 1. An area surrounded by the functional cuts 2 as a functional area for sensing and measurement, the functional area is provided with the patterned electrode 4, and sticking copper foils at pins of the patterned electrode 4 to lead out the wires 5.

The sensor provided by the disclosure has certain requirements for thickness and bending, therefore adopting a flexible film as the sensor substrate 1 to make anisotropic sensor structures. Preferably, the sensor substrate 1 is a flexible film made of one of PIC hydrogel, PET, PDMS, and so on. Preferably, a material of the patterned electrode 4 is one of a group consisting of silver nanowire, gold, copper, other metals, ITO, PEDOT:PSS, other metallic oxides, and other conductive polymers. Manufacturing processes of the patterned electrode 4 are adjusted according to the selected materials, and the processes such as spin coating, etching, vapor deposition, and magnetron sputtering can be adopted. Preferably, the adhesive layer 6 is an acrylic adhesive layer, when the sensor is used for human skin, the adhesive layer 6 is preferably a medical adhesive; when the sensor is used for a surface of a common workpiece, the adhesive layer 6 is preferably a 3M double-sided adhesive tape.

To ensure a strength and flexibility of the sensor, a thickness of the sensor substrate 1 is 0.1~0.5 mm; a total thickness of the sensor is less than 3 mm; a gap width of each of the functional cuts is less than 0.2 mm; a diameter of each of the crack-arrest holes are 0.5~3 mm; a thickness of the patterned electrode 4 is more than 0.1 mm, and a line width of the patterned electrode 4 is less than 0.3 mm.

Embodiment 1

Adopting the PIC hydrogel as a sensor substrate to prepare a sensor, the specific steps are described below.

Step 1, in order to prepare a PIC hydrogel flexible film, first immersing PIC powder in salt solution (concentration of the salt solution is 2.5 moles per liter (mol/L)) in a centrifuge tube at 90 Celsius degrees (° C.) for 6 hours, therefore obtaining a mixture; then centrifuging the mixture in the centrifuge tube at 5000~14000 revolutions per minute (rpm) for 10 minutes with three times per hour, removing bubbles and obtaining a uniform PIC hydrogel. Then keeping the PIC hydrogel at 90° C. for 10 minutes to increase its fluidity, and pouring it into a polytetrafluoroethylene (PTFE) mold; immediately compressing the PIC hydrogel in the PTFE mold at a room temperature for 20 minutes to form the PIC hydrogel flexible film. After forming the PIC hydrogel flexible film, taking out the PIC hydrogel flexible film from the PTFE mold, sticking an acrylic adhesive layer at a bottom of the PIC hydrogel flexible film as an adhesive layer 6, and sticking a release paper 7 at a bottom of the acrylic adhesive layer to protect the adhesive layer 6.

Step 2, designing a cut pattern by a graphic design software such as AutoCAD or CorelDRAW, obtaining functional cuts 2 of the PIC hydrogel flexible film for controllable adhesion through a forming process such as laser cutting, blanking or etching, using industrial alcohol to clean a surface of the PIC hydrogel flexible film, and treating the PIC hydrogel flexible film by plasmas with 40~100 W power for 2~5 minutes, improving surface activity of the PIC hydrogel.

Step 3, sticking a metal mask having a pattern of the patterned electrode 4 on the surface of the PIC hydrogel flexible film, since the PIC hydrogel flexible film has certain viscosity, the PIC hydrogel flexible film can closely adhere to the metal mask without an adhesive agent.

Step 4, dropping a silver nanowire (also referred to as argentum nano wire, abbreviated as AgNW) suspension into a pattern gap of the metal mask, removing the metal mask after the solvent of the suspension is volatilized, and sticking copper foils at the pins of the patterned electrode 4 to lead out the wires 5, therefore obtaining an AgNW/PIC hydrogel flexible film. Obtaining the sensor disclosed by the disclosure eventually.

In addition, for the sensor prepared in the embodiment 1, since the PIC hydrogel is easy to change it properties due to water loss, in the step 2, after obtaining functional cuts 2 of the PIC hydrogel flexible film for controllable adhesion, the PIC hydrogel flexible film shall be placed in water, taking out the PIC hydrogel flexible film from the water when the PIC hydrogel flexible film is used, and the patterned electrode 4 shall be prepared within 1 hour and corresponding tests shall be completed. Technical schemes of the disclosure are not limited to this material and usage method, and users should adjust the technical schemes according to different situations.

Embodiment 2

Adopting the PDMS as a sensor substrate to prepare a sensor. The main difference from the embodiment 1 is the preparation method of a sensor substrate 1 in step 1, the specific steps are described below.

Step 1, first, mixing basic components (i.e., PDMS precursor) and curing agent of Dow Corning 184 completely while a weight ratio of basic components:curing agent is 10:1, therefore obtaining a mixed solution, putting the mixed solution in a centrifuge and mixing the mixed solution at 500~2000 rpm for 5~10 minutes, then injecting the mixed solution into a PTFE mold and defoaming the mixed solution under vacuum, putting the mixed solution into an oven at 65° C. and heating the mixed solution for 1~2 hours, obtaining a PDMS flexible film as the sensor substrate 1 eventually. After demoulding the PDMS flexible film from the PTFE mold, sticking an acrylic adhesive layer at a bottom of the sensor substrate 1 as the adhesive layer 6, and sticking a release paper 7 at a bottom of the acrylic adhesive layer to protect the adhesive layer 6.

Step 2, obtaining functional cuts 2 for controllable adhesion through laser cutting or blanking process, using industrial alcohol to clean a surface of the sensor substrate, and treating the sensor substrate 1 by plasmas with 40~100 W power for 2~5 minutes, improving surface activity of the sensor substrate 1.

Step 3, sticking a metal mask having a pattern of the patterned electrode 4 on the surface of the sensor substrate 1, since adhesion between the PDMS flexible film and the metal mask is weak, applying a silicone rubber glue to an edge of the metal mask, then covering the surface of the sensor substrate 1 with the metal mask, then let the sensor substrate 1 stand for 10 minutes to make the sensor substrate 1 fit closely with the metal mask, and then wiping off the residual silicone rubber glue on the surface of the sensor substrate 1.

Step 4, dropping a silver nanowire suspension into a pattern gap of the metal mask, removing the metal mask after the solvent is volatilized, and sticking copper foils at the pins of the patterned electrode 4 to lead out the wires 5, that is, the sensor disclosed by the disclosure.

Embodiment 3

Figure 5:
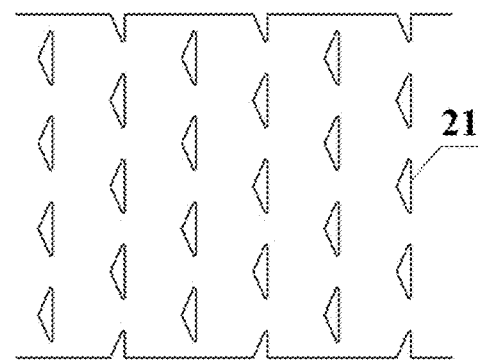
FIG. 5 (a) is a schematic diagram of a sensor cut pattern formed by hollow type cuts having asymmetric adhesion.
Figure 5:
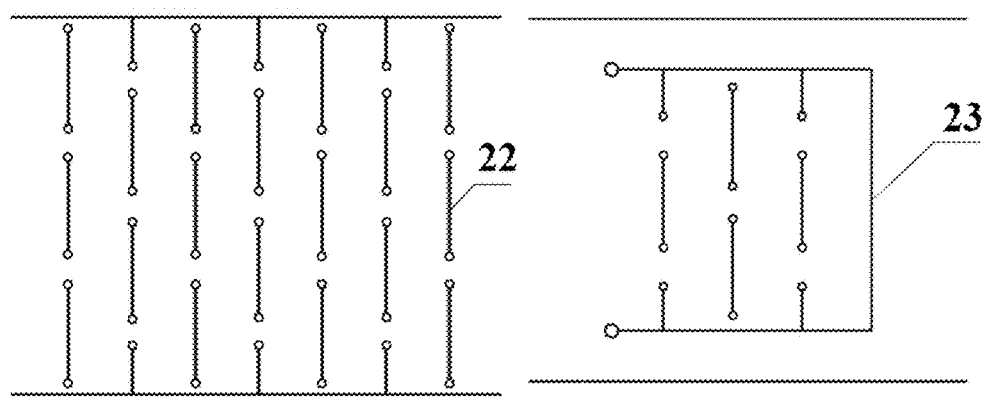

In order to make the sensor meet different requirements of adhesion, patterns of the functional cuts disclosed by the disclosure as shown in FIG. 5 (a), FIG. 5 (b), and FIG. 5 (c). The FIG. 5 (a) shows a sensor cut pattern formed by hollow type cuts 21 having asymmetric adhesion, the FIG. 5 (b) shows a sensor cut pattern formed by dashed line type cuts 22, and the FIG. 5 (c) shows a sensor cut pattern formed by an asymmetric dashed line type cut 23. Among them, the sensor with the hollow type cuts 21 not only has the characteristics of strong adhesion and good tearability, but also can protect a surface protrusion of a sensed object, and can also monitor electronic devices and microstructures in real time. A shape of each hollow type cut 21 may be one of shapes such as isosceles triangle, isosceles trapezoid, and semicircle; the shapes can be adopted if the shapes are oriented and not closed. The sensor with dashed line type cuts 22 can fit well with highly deformed and complex contour, such as applied to the surface of skin, joints and irregular structures. The sensor with asymmetric dashed line type cuts 23 has characteristics of good deformability, strong adhesion, and easy tearability.

Figure 2:
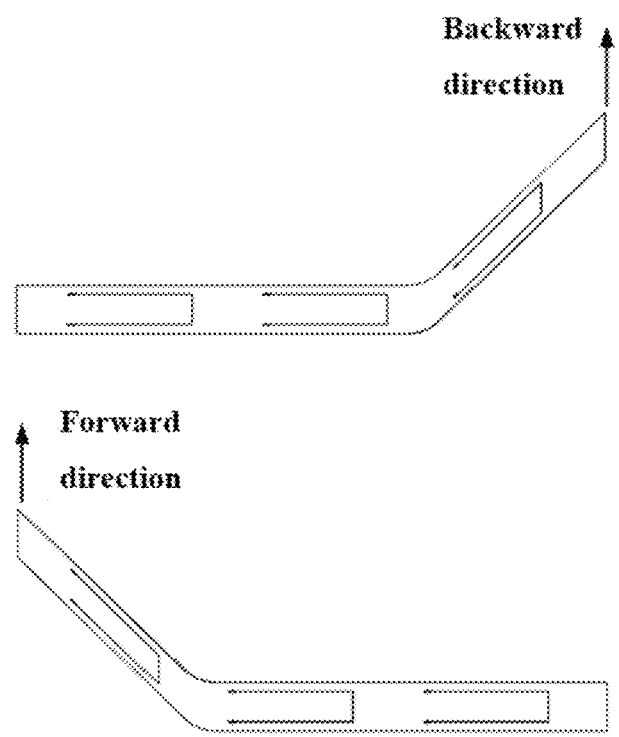
FIG. 2 (a) is a schematic diagram of forces applied to a sensor with a square adhesion functional area.
Figure 2:
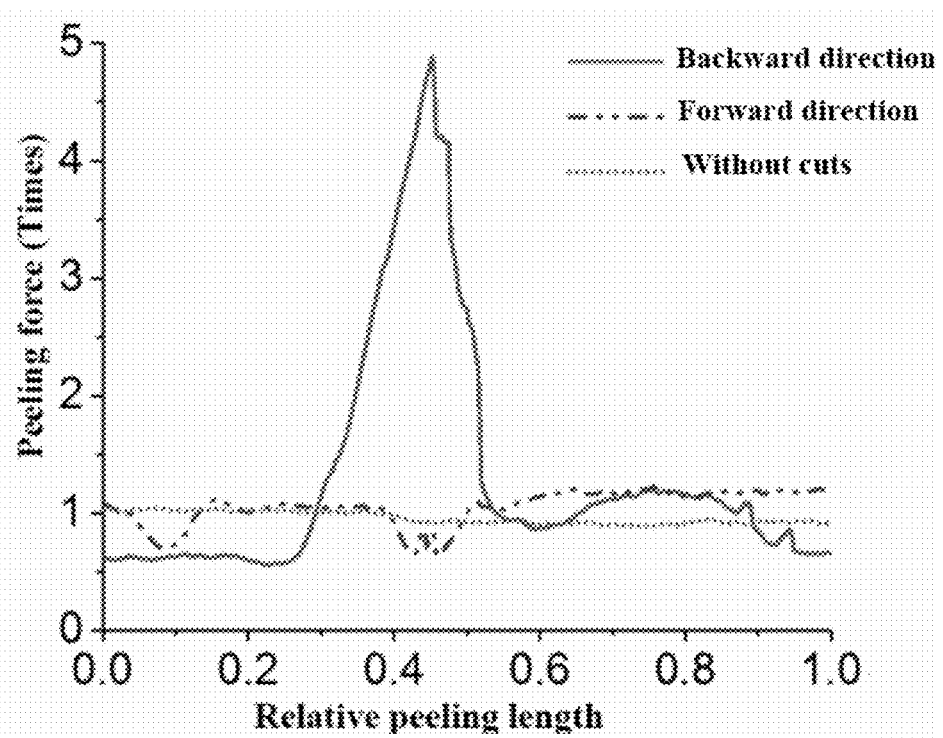

FIG. 2 (a) is a schematic diagram of forces applied to the sensor with a square adhesion functional area, FIG. 2 (b) is a comparison diagram of the sensor with the square adhesion functional area peeled along a forward and backward directions. In addition, a dimensionless peeling force is lead into the FIG. 2 (b), the dimensionless peeling force is derived from a standardized treatment in a case of a sensor without any cuts. The forward low peeling force and the backward high peeling force are the essence of strong adhesive and easy peelability of the sensor disclosed by the disclosure. Further, table 1 reveals comparative data of peeling forces of sensors with different cuts. When widths of the sensors with different cuts are the same, it indicates that unclosed cuts are more obvious in characteristics of strong adhesion and easy peelability.

TABLE 1

Comparative data of peeling forces of sensors with different cuts:

| Cut types of tested sensors | Maximum forward peeling force (unit: N) | Maximum backward peeling force (unit: N) | Ratio of backward/ forward peeling force |
|---|---|---|---|
| Hollow type | 6.24 | 24.51 | 3.93 |
| Unclosed type | 6.45 | 11.08 | 1.72 |
| Dashed line type | 6.22 | 6.37 | 1.02 |
| Asymmetric dashed line type | 7.81 | 15.78 | 2.02 |

Embodiment 4

Figure 3:
FIG. 3 (a) is a schematic diagram of a sensor with dashed line type cuts attached to a human joint.
Figure 3:
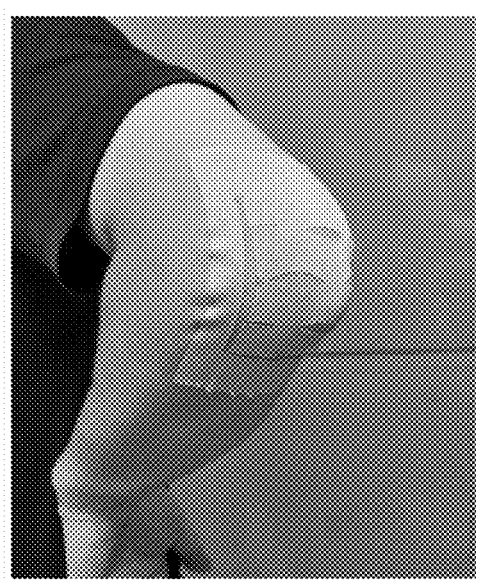

A sensor with dashed line type cuts prepared by the disclosure can be applied to surfaces with large bending degree and large deformation, such as human skin and joints, and workpieces with large turning angles and complex curved surfaces. First, peeling off a release paper 7 at a bottom of the sensor, sticking an area surrounded by the dashed line type cuts 21 (i.e., a functional area) to a surface of an object to be tested, then sticking the rest area of the sensor tightly, connecting the sensor with the detection circuit to complete sensing tests, and after the sensing tests are completed, peeling off the sensor along a direction of a forward peeling force. Sticking the sensor prepared by the disclosure on a human joint as shown in FIG. 3 (a) and FIG. 3 (b). FIG. 3 (a) is a schematic diagram of the sensor with dashed line type cuts attached to a human joint, and FIG. 3 (b) is a schematic diagram of the sensor with asymmetric dashed line type cuts attached to the human joint.

Embodiment 5

Performing peeling tests of the sensor prepared by the disclosure.

Figure 4:
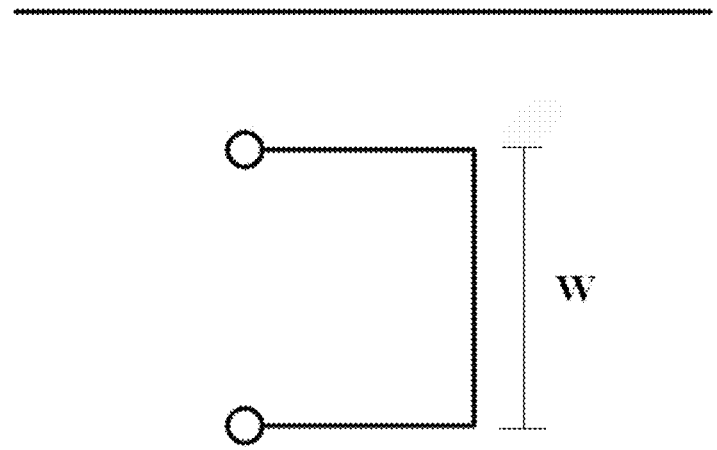
FIG. 4 (a) is a schematic structural diagram of a functional area of a sensor.
Figure 4:
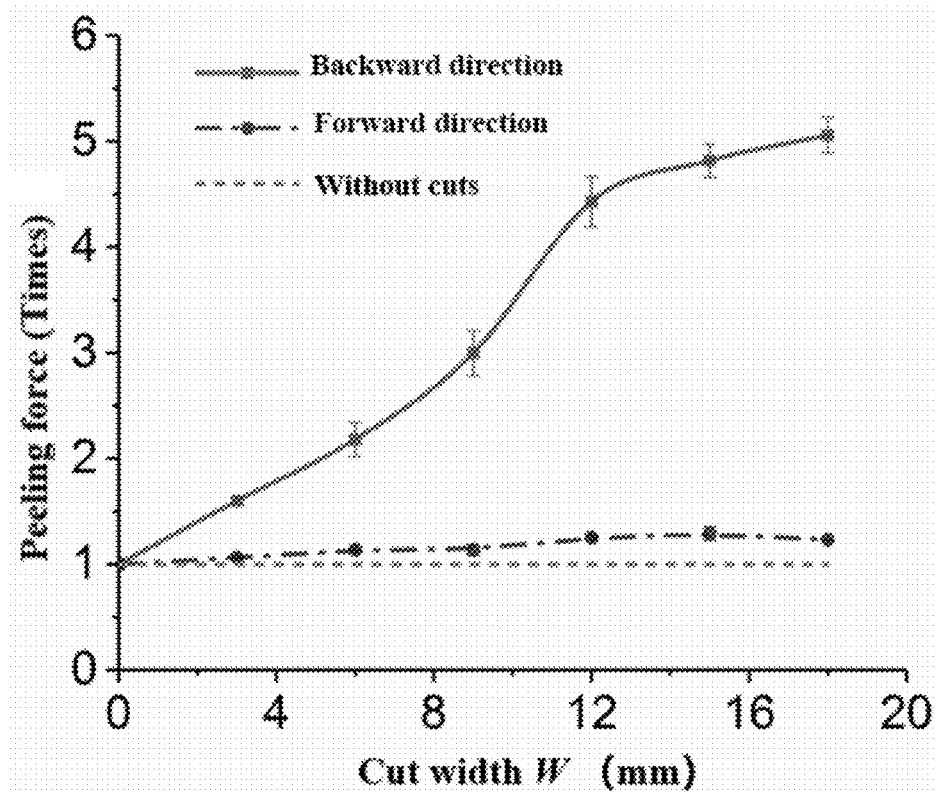

FIG. 4 (a) is a structural schematic diagram of a functional area of a sensor, and FIG. 4 (b) is the relationship curves of peak peeling force versus different widths of the functional areas under opposite peeling directions. It can be seen from the FIG. 4 (b), when cut widths of the disclosure are the same, an adhesion difference between the forward and backward directions is more obvious with increases of cut widths. However, the wider the cuts, the sensor is weaker, therefore the cut widths should be selected according to material characteristics, sizes and strength of the sensor.

Embodiment 6

Performing uniaxial tension and repeated sticking tests of sensors with or without cuts prepared by the disclosure, and a displacement increment of the sensor under the uniaxial tension to an initial length of the sensor is taken as a strain value.

Figure 6:
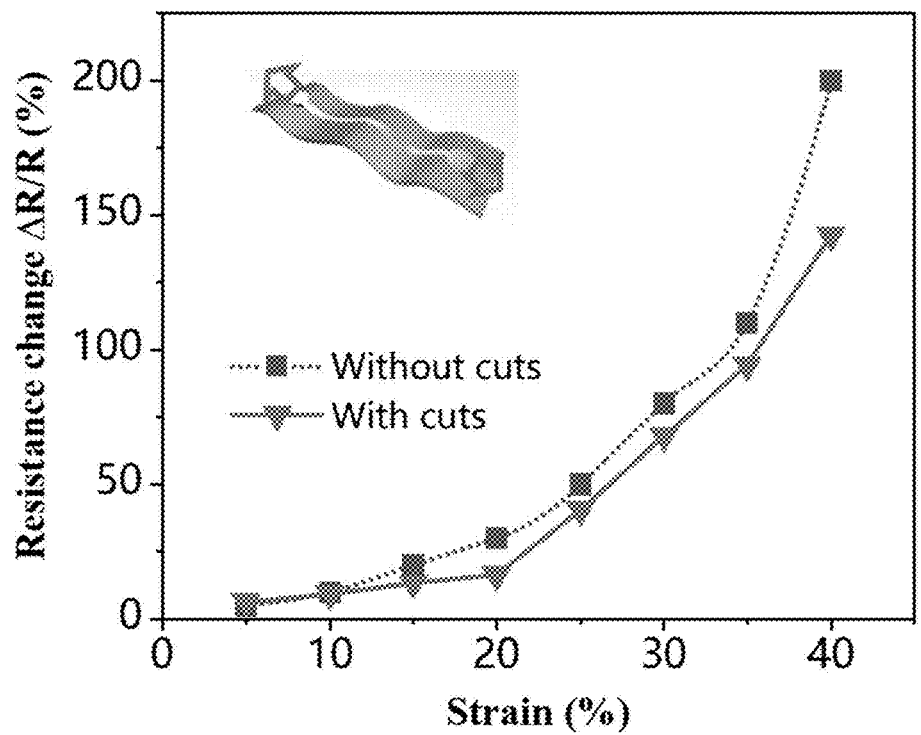
FIG. 6 (a) is a schematic diagram of resistance change curves of a sensor with a square cut (solid line) or without cuts (dash line) under uniaxial tension.
Figure 6:
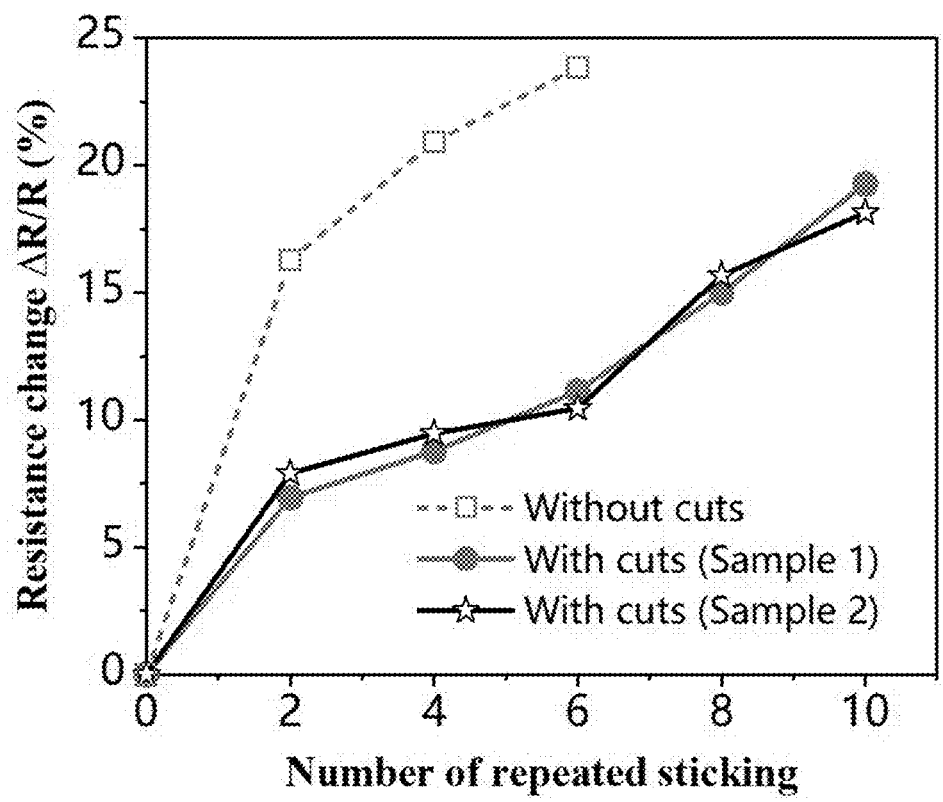

FIG. 6 (a) is a schematic diagram of resistance change curves of a sensor with a square cut (solid line) or without cuts (dash line) under the uniaxial tension, FIG. 6 (b) is a schematic diagram of resistance change curves of a sensor with or without a square cut under repeating sticking. As shown in FIG. 6 (a), a mapping relationship of a sensor with the square cut between strain and resistance is significant when the percentage of the strain is less than 40%. As shown in FIG. 6 (b), an electrical performance of a sensor with the square cut is still good after 10 times of the repeated sticking.

Embodiment 7

Figure 7:
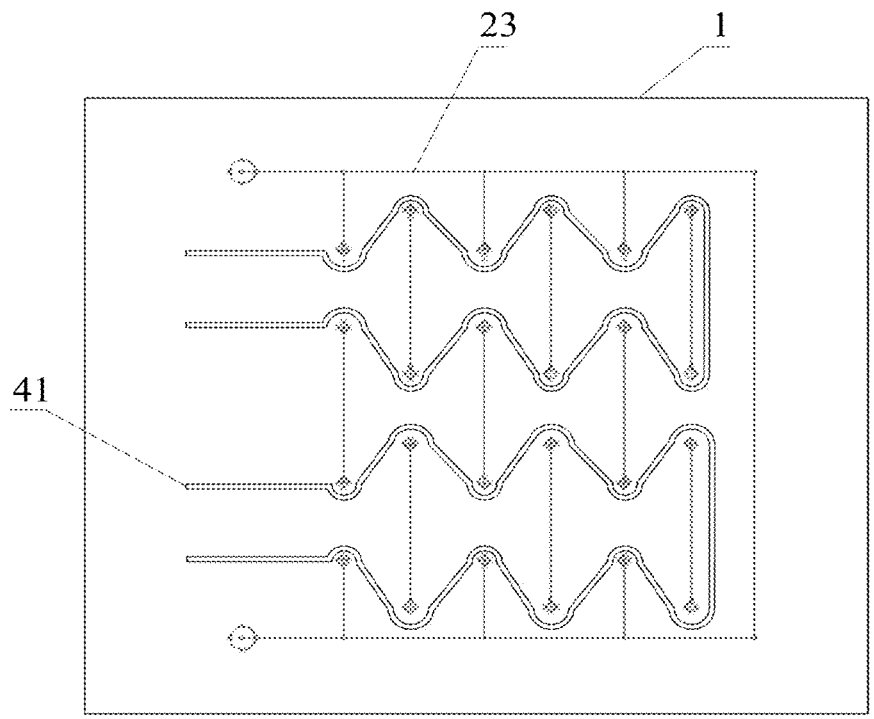
FIG. 7 (a) is a schematic structural diagram of a sensor with dashed line type cuts based on paper cutting.
Figure 7:
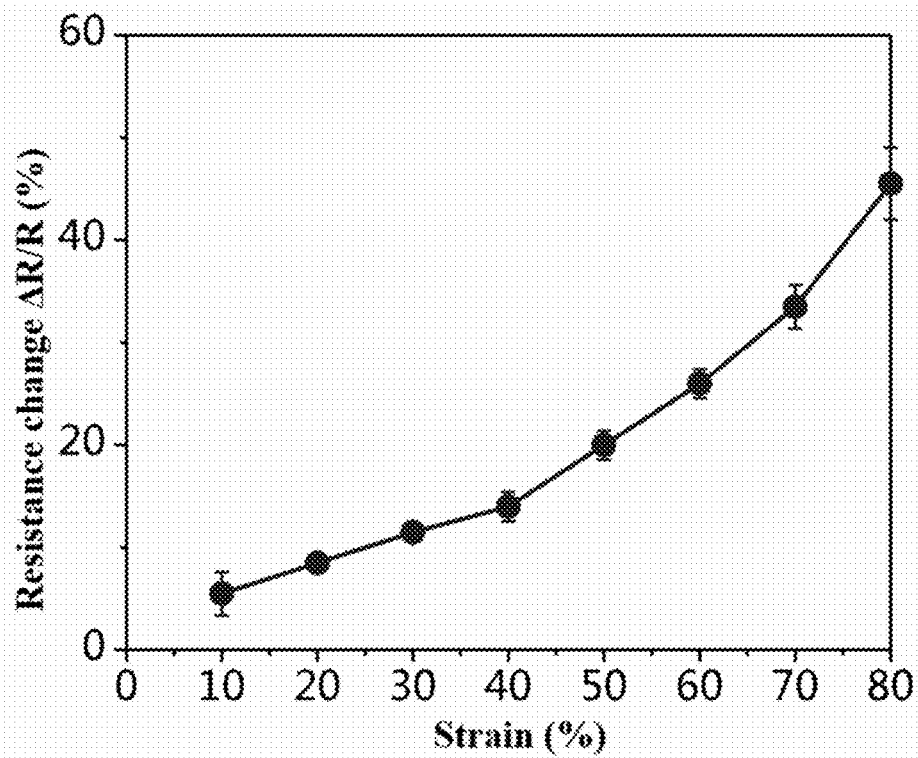

FIG. 7 (a) is a schematic structural diagram of a sensor with asymmetric dashed line type cuts 23, FIG. 7 (b) is a strain-resistance change curve diagram of the sensor with the asymmetric dashed line type cuts 23. The FIG. 7 (a) shows a patterned electrode is a serpentine electrode 41 surrounded by the asymmetric dashed line type cuts 23.

Embodiment 8

Figure 8:
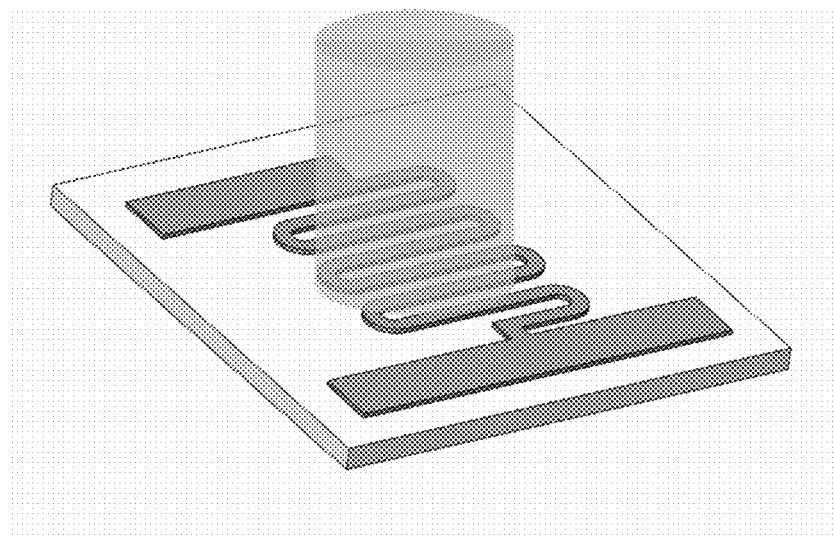
FIG. 8 (a) is a schematic diagram of a sensor placing an object.
Figure 8:
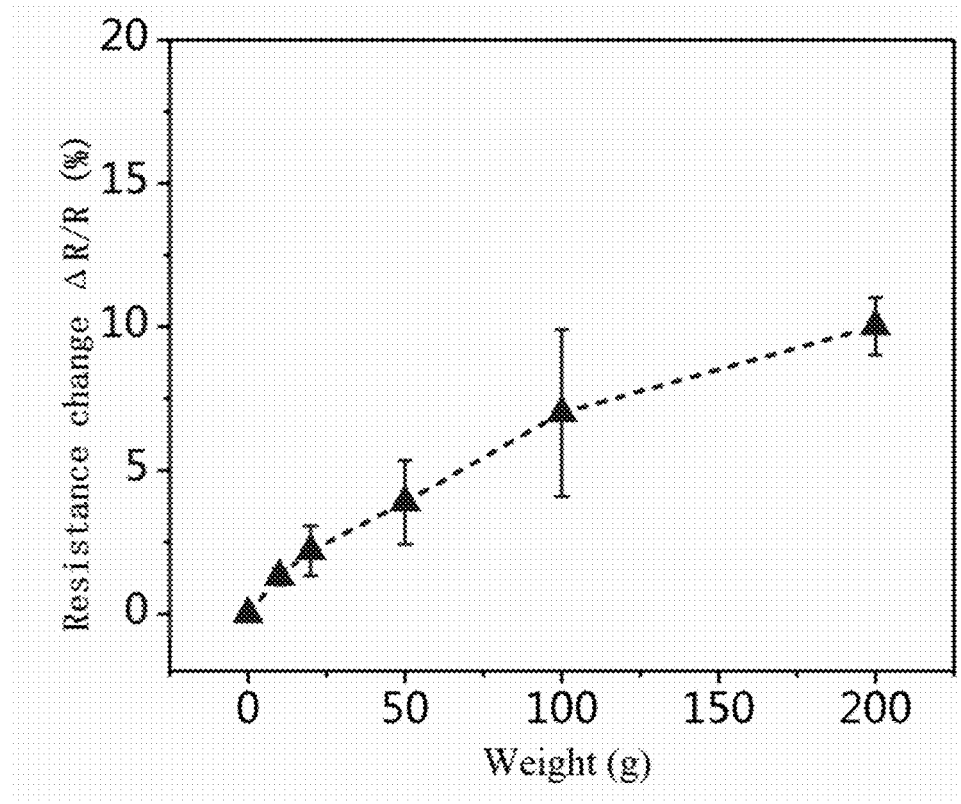

Performing a load-bearing test of a sensor prepared by the disclosure. Weight of the load-bearing tests are provided by counterweights. In order to avoid damaging a patterned electrode 4 of the sensor, a piece of dust-free paper is placed between the patterned electrode 4 and the counterweights; FIG. 8 (a) is a schematic structural diagram of a sensor placing an object, and FIG. 8 (b) is a weight-resistance induction curve diagram of the sensor. A value of resistance change is a percentage value obtained by resistance increment of the sensor compared with resistance of the sensor without load.

Figure 9:
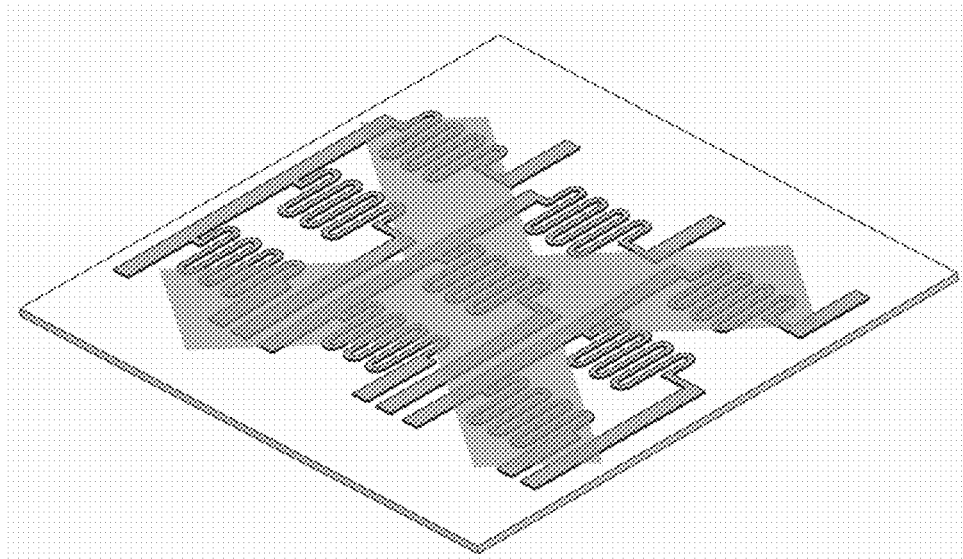
FIG. 9 (a) is a schematic diagram of an array of sensors placing an "X" shaped object.
Figure 9:
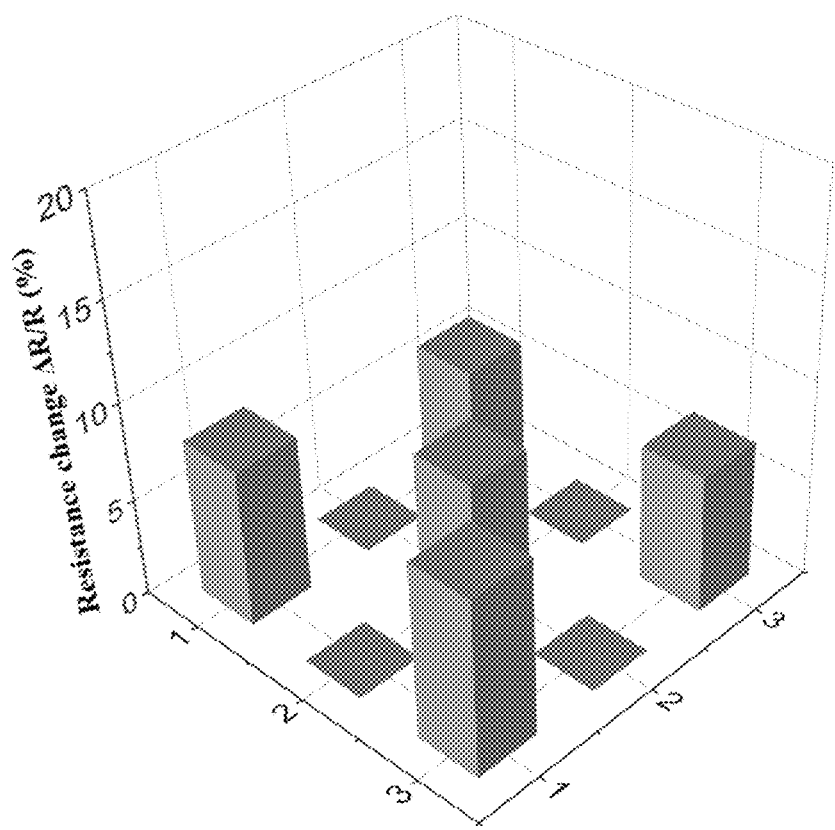
Figure 9:
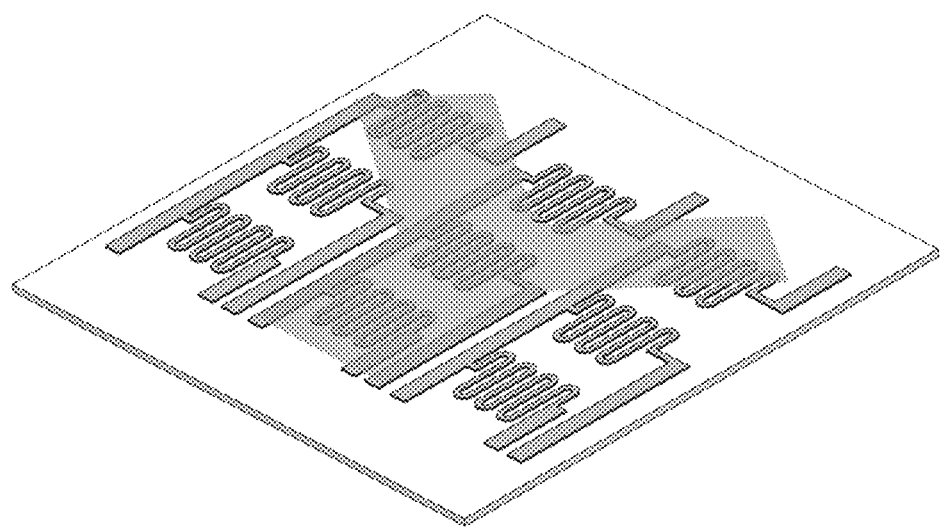
Figure 9:
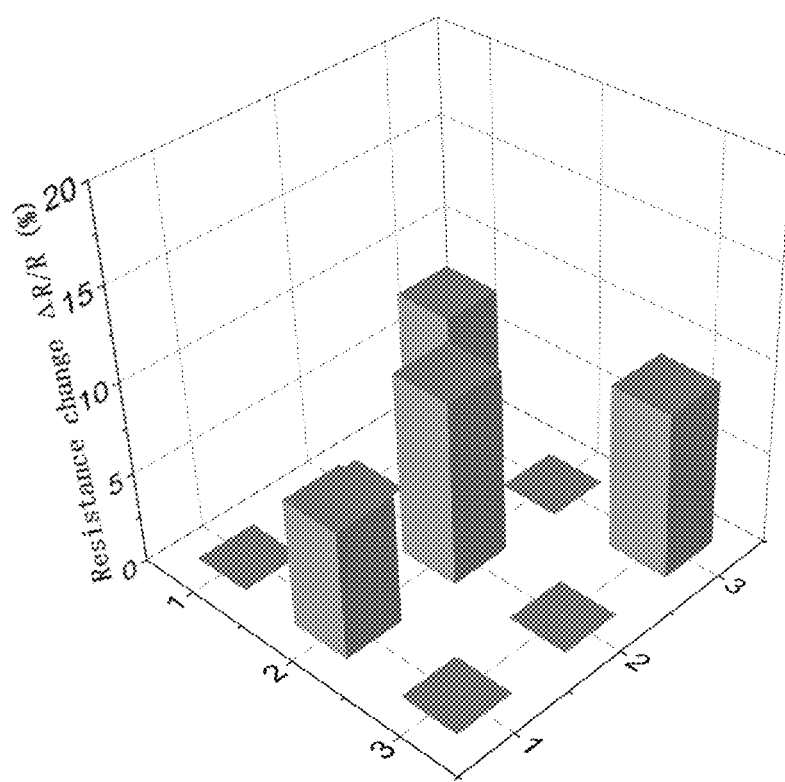
Figure 10:
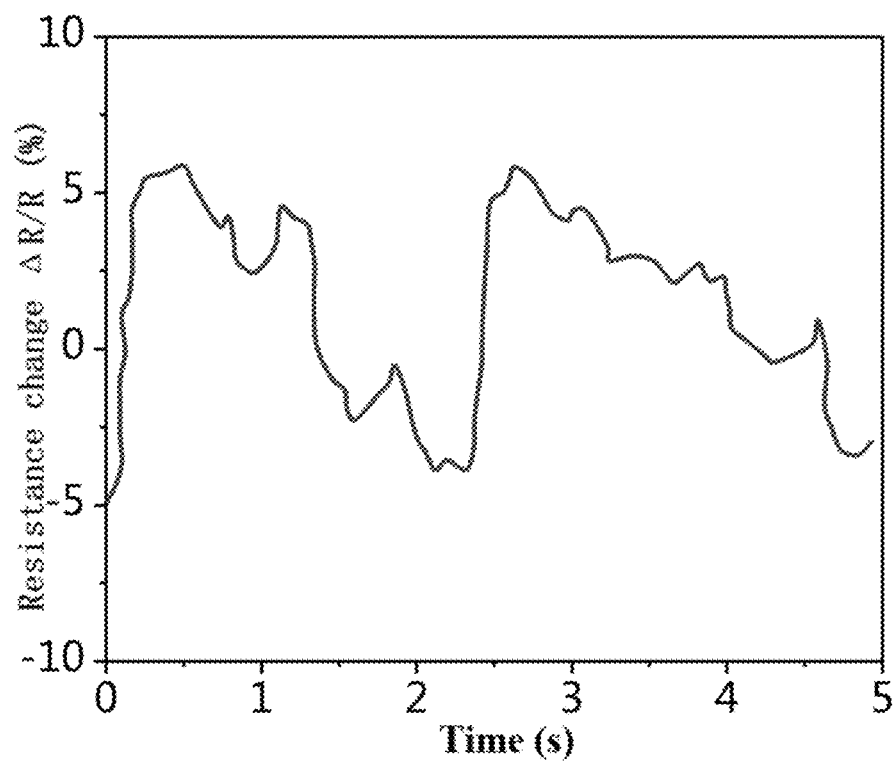
FIG. 10 (a) is a schematic diagram of a resistance change curve of a sensor based on vibration.
Figure 10:
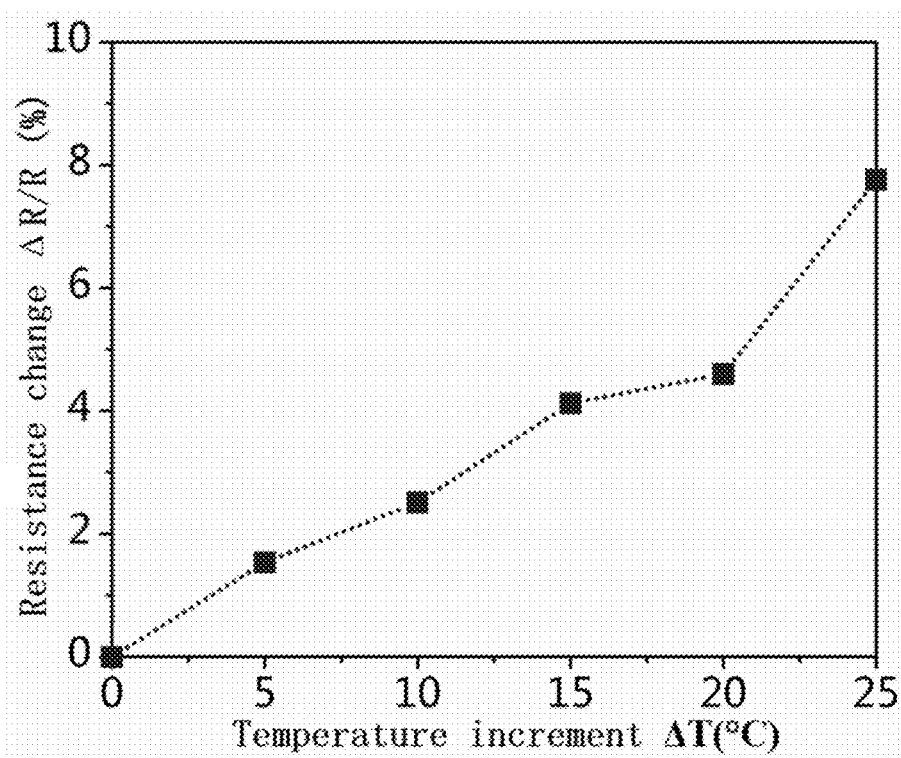

Performing load-bearing tests of sensors prepared by the disclosure, "X" and "Y" represent acrylic (PMMA) plates cut by laser respectively, and counterweights are placed on the PMMA plates respectively. FIG. 9 (a) is a schematic diagram of an array of sensors placing an "X" shaped object, FIG. 9 (b) is a weight-resistance induction curve diagram of the array of sensors when the "X" shaped object is placed, FIG. 9 (c) is a schematic diagram of the array of sensors placing a "Y" shaped object, and FIG. 9 (d) is a weight-resistance induction curve diagram of the array of sensors when the "Y" shaped object is placed. FIG. 10 (a) shows a vibration-resistance induction curve which is actually a resistance change curve of a sensor prepared by the disclosure attached to a human neck with time of speaking, speaking a word such as "ni hao" in the FIG. 10 (a). Real-time resistance is recorded by a digital universal meter with a model of Victor® VC8246B. FIG. 10 (b) shows a temperature-resistance induction curve in a temperature test; in the temperature test, a sensor prepared by the disclosure is stuck on an outer wall of a glass cup, the glass cup is filled with 30° C. water, hot water is gradually injected into the glass cup, and the temperature and resistance changes are recorded by an infrared thermometer and the digital universal meter. In order to ensure the temperature of the hot water is fully transmitted to the sensor, each test needs to last for 1 minute. When the temperature of the sensor increases, the resistance change of the sensor increases.

The above descriptions are only some embodiments of the disclosure and cannot limit the scope of the disclosure; Meanwhile, the above description should be understood and implemented by those skilled in the relevant technical field. Therefore, other equivalent changes or modifications based on spirit disclosed in the disclosure should be within the scope of the patent application.

What is claimed is:

1. A sensor, comprising a sensor substrate, an adhesive layer, and a release paper sequentially connected in that order; wherein a surface of the sensor substrate is provided with functional cuts; one of the functional cuts is a cutting line disposed axisymmetrically along a peeling direction and penetrates the sensor substrate; ends of the functional cuts each are provided with crack-arrest holes; a patterned electrode is surrounded by the functional cuts, the patterned electrode is adhered on the surface of the sensor substrate, and pins of the patterned electrode are connected to wires respectively; the functional cuts form an asymmetric dashed line type pattern; the asymmetric dashed line type pattern is a sensor cut pattern having both a dashed line type pattern and an asymmetric adhesion type pattern; a ratio of a width of one of the functional cuts to a width of the sensor substrate is more than 1:4.

2. The sensor according to claim 1, wherein the sensor substrate is a flexible film made of one of polyisocyanate (PIC) hydrogel, polyethylene terephthalate (PET), and polydimethylsiloxane (PDMS).

3. The sensor according to claim 1, wherein a material of the patterned electrode is one of silver nanowire, gold, copper, tin-doped indium oxide (ITO), and poly(3,4-ethylenedioxythiophene):poly(styrene sulfonate) (PEDOT:PSS).

4. The sensor according to claim 1, wherein the adhesive layer is an acrylic adhesive layer.

5. The sensor according to claim 1, wherein a thickness of the sensor substrate is in a range of 0.1 mm to 0.5 mm; a thickness of the sensor is less than 3 mm; a gap width of each of the functional cuts is less than 0.2 mm; a diameter of each of the crack-arrest holes is in a range of 0.5 mm to 3 mm; a thickness of the patterned electrode is more than 0.1 mm, and a line width of the patterned electrode is less than 0.3 mm.

6. A preparation method of the sensor according to claim 1, comprising following steps:
step (1): using a flexible film to prepare the sensor substrate, sticking the adhesive layer on a bottom of the flexible film, and sticking the release paper on a bottom of the adhesive layer as a protective layer;
step (2): obtaining the functional cuts for controllable adhesion by one of laser cutting and blanking process, using industrial alcohol to clean a surface of the sensor substrate, and treating the sensor substrate by plasmas with 40~100 watt (W) power for 2~5 minutes to improve surface activity of PIC hydrogel;
step (3): sticking a metal mask having a pattern of the patterned electrode on the surface of the sensor substrate prepared in the step (1);
step (4): depositing a material of the patterned electrode into a pattern gap of the metal mask by one of spin coating, etching, vapor deposition, and magnetron sputtering; then removing the metal mask after a solvent being volatilized, and sticking copper foils at the pins of the patterned electrode to lead out the wires, thereby obtaining the sensor.

* * * * *